Figure 2:
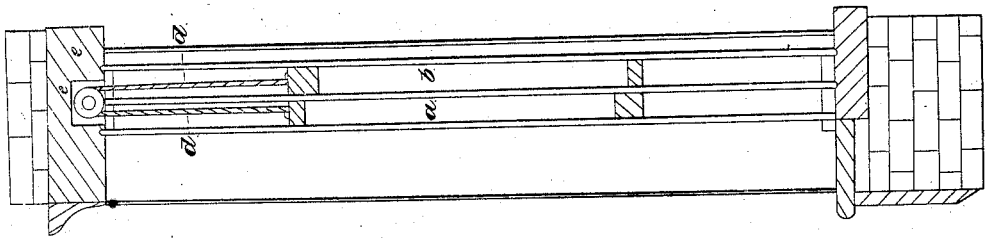
Figure 1:
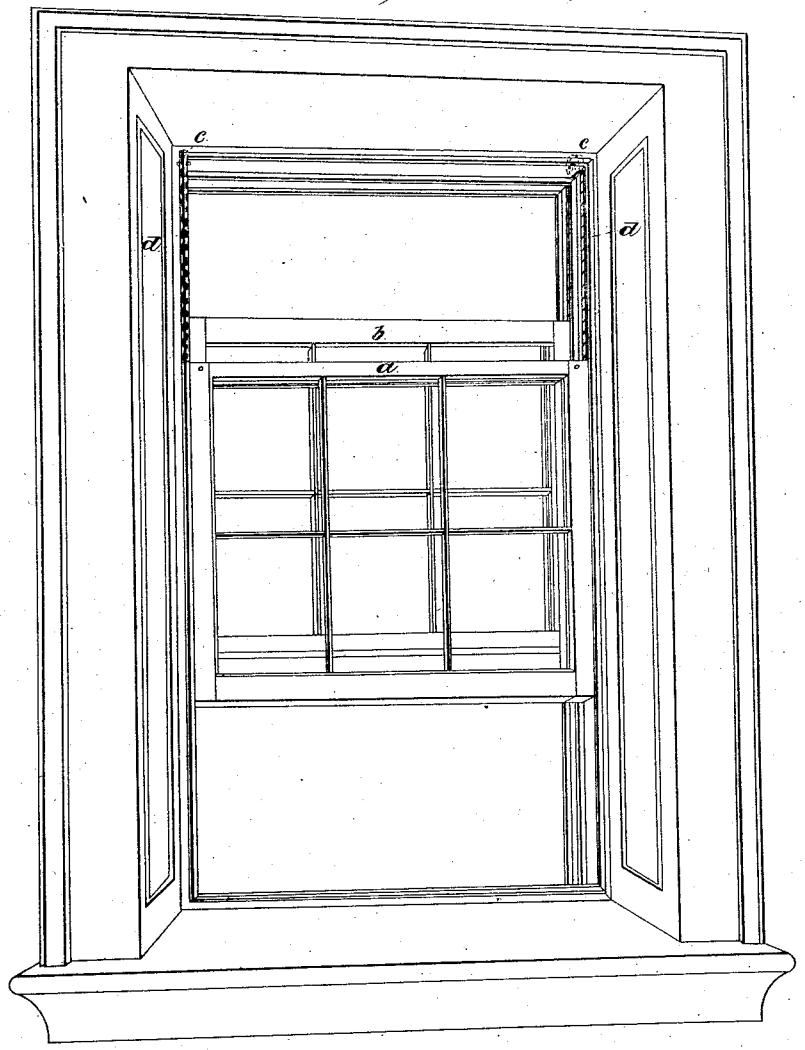

3596X

Sheet 1 - 2 Sheets.

F. Follet,

Sash Balance.

Patented Oct. 15, 1822.

3596X
Sheet 2 - 2 Sheets
F. Follet,
Sash Balance.
Patented Oct. 15, 1822.
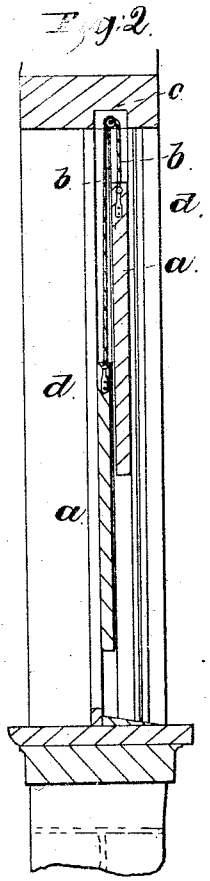
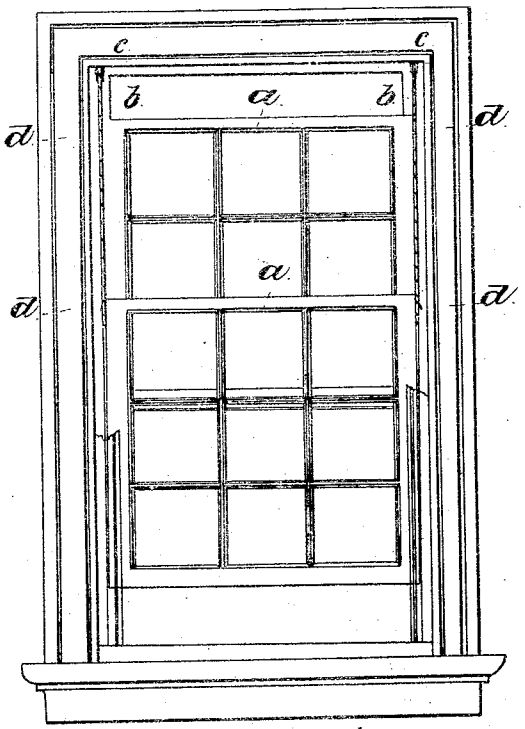

United States Patent Office

PTO - BOYERS, PA Duty Station

MISSING PAGE TEMPORARY NOTICE

PATENT # 3596X FOR ISSUE DATE 10-15-1822

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text

Data Conversion Operation

Boyers, Pa